United States Patent
Shah et al.

(10) Patent No.: US 10,570,801 B2
(45) Date of Patent: Feb. 25, 2020

(54) SYSTEM AND METHOD OF DETECTING AN OBSTRUCTED PRESSURE LINE IN A DIESEL EXHAUST FLUID DELIVERY SYSTEM

(71) Applicant: Robert Bosch Gmbh, Stuttgart (DE)

(72) Inventors: Ashal J. Shah, South Lyon, MI (US); Palanimuthu Thalamuthu, Farmington Hills, MI (US); Oliver Wintersteller, Howell, MI (US)

(73) Assignee: Robert Bosch GmbH, Stuttgart (DE)

( * ) Notice: Subject to any disclaimer, the term of this patent is extended or adjusted under 35 U.S.C. 154(b) by 254 days.

(21) Appl. No.: 15/629,136

(22) Filed: Jun. 21, 2017

(65) Prior Publication Data

US 2017/0370269 A1 Dec. 28, 2017

Related U.S. Application Data

(60) Provisional application No. 62/354,422, filed on Jun. 24, 2016.

(51) Int. Cl.
*F01N 11/00* (2006.01)
*F01N 3/20* (2006.01)

(52) U.S. Cl.
CPC .......... *F01N 11/005* (2013.01); *F01N 3/2006* (2013.01); *F01N 3/208* (2013.01); *F01N 3/2066* (2013.01); *F01N 11/00* (2013.01); *F01N 2550/05* (2013.01); *F01N 2610/14* (2013.01); *F01N 2610/148* (2013.01); *F01N 2900/0418* (2013.01); *F01N 2900/1808* (2013.01); *F01N 2900/1824* (2013.01); *Y02A 50/2325* (2018.01); *Y02T 10/24* (2013.01); *Y02T 10/47* (2013.01)

(58) Field of Classification Search
CPC ...... F01N 11/00; F01N 11/005; F01N 3/2006; F01N 3/2066; F01N 3/208; F01N 2550/05; F01N 2610/14; F01N 2610/148; F01N 2900/0418; F01N 2900/1808; F01N 2900/1824

See application file for complete search history.

(56) References Cited

U.S. PATENT DOCUMENTS

| 6,721,375 | B1 * | 4/2004 | Hammel | G01D 3/02 375/350 |
| 8,971,361 | B2 | 3/2015 | Bruck et al. | |
| 2008/0282681 | A1 * | 11/2008 | Katou | B01D 53/9409 60/286 |

(Continued)

FOREIGN PATENT DOCUMENTS

DE 19514410 A1 * 10/1996 ............. G01L 23/08

*Primary Examiner* — Matthew T Largi
(74) *Attorney, Agent, or Firm* — Michael Best & Friedrich LLP (57) ABSTRACT

A method and system for detecting whether a pressure line in a diesel exhaust fluid (DEF) delivery system has an obstruction. The system includes an electronic control unit with an electronic processor that is configured to receive an unfiltered pressure signal from a pressure sensor; to electronically filter the unfiltered pressure signal to determine a dosing pressure signal; to determine an integrated value based on the dosing pressure signal; and to determine whether the pressure line is obstructed by comparing the integrated value with a predetermined threshold.

18 Claims, 6 Drawing Sheets

(56) References Cited

U.S. PATENT DOCUMENTS

| | | | |
|---|---|---|---|
| 2010/0071349 A1* | 3/2010 | Kitazawa | F01N 3/2066 60/277 |
| 2010/0115918 A1* | 5/2010 | Sawada | B01D 53/30 60/276 |
| 2010/0139254 A1* | 6/2010 | Sebestyen | F01N 11/00 60/286 |
| 2013/0276429 A1* | 10/2013 | Barcin | F01N 3/18 60/274 |
| 2014/0053535 A1 | 2/2014 | Dyrbusch et al. | |
| 2014/0305100 A1* | 10/2014 | Shin | F01N 3/208 60/274 |
| 2015/0322840 A1 | 11/2015 | Winkler et al. | |
| 2016/0010529 A1* | 1/2016 | Wang | F17D 3/00 60/274 |
| 2016/0040577 A1 | 2/2016 | Nihongi et al. | |
| 2016/0040581 A1 | 2/2016 | Ratan et al. | |
| 2016/0160725 A1 | 6/2016 | Hudgens et al. | |

\* cited by examiner

SYSTEM AND METHOD OF DETECTING AN OBSTRUCTED PRESSURE LINE IN A DIESEL EXHAUST FLUID DELIVERY SYSTEM

RELATED APPLICATIONS

The present application claims priority to U.S. Provisional Application 62/354,422, filed Jun. 24, 2016, the entire contents of which are hereby incorporated by reference.

FIELD

The present disclosure relates to systems and methods of detecting an obstruction in a pressure line in a Diesel Exhaust Fluid (DEF) delivery system for a vehicle.

BACKGROUND

Modern vehicles incorporate various types of emission-reduction techniques to reduce environmentally-harmful emissions. Diesel engines, in particular, are equipped with exhaust systems designed to reduce undesirable byproducts of combustion. In some instances, vehicles with diesel engines include diesel exhaust fluid (DEF) delivery systems configured to inject DEF into an exhaust stream of a vehicle to reduce nitrogen oxides in vehicle emissions.

A DEF delivery system houses DEF in a storage tank until use. A pump transfers the DEF via a pressure line to the exhaust system. After the DEF delivery system builds pressure in the pressure line and enters a metering control state (for example, a ready-to-dose state), DEF in the pressure line can freeze or otherwise solidify, which causes the pressure line to become obstructed. Once obstructed, DEF is prevented from entering the exhaust stream and reacting with the vehicle emissions.

Some known DEF delivery systems detect malfunctions within the system by detecting when DEF is not being consumed. Other delivery systems detect malfunctions when excessive levels of nitrogen oxides are detected in the exhaust stream. Both of these detection methods require a long period of time to identify that a malfunction has occurred. In the meantime, these DEF delivery systems assume that they are still injecting DEF, and therefore fail to identify failures within the DEF delivery systems.

SUMMARY

Embodiments listed herein describe various techniques for detecting malfunctions in DEF delivery systems. In particular, embodiments provide a way to detect an obstruction within a pressure line of a DEF delivery system by analyzing pressure fluctuations within the pressure line.

One embodiment provides a method of detecting whether a pressure line in a diesel exhaust fluid (DEF) delivery system has an obstruction. The method includes receiving an unfiltered pressure signal from a pressure sensor; electronically filtering the unfiltered pressure signal to obtain a filtered pressure signal; and determining a dosing pressure signal based on the filtered pressure signal and the unfiltered pressure signal. Based on the dosing pressure signal, an integrated value is determined. An electronic control unit then determines whether the pressure line is obstructed by comparing the integrated value with a predetermined threshold.

Another embodiment provides diesel exhaust fluid (DEF) delivery system in a vehicle that detects whether a pressure line is obstructed. The system includes a pressure line configured to supply the DEF to an exhaust pipe; a pressure sensor connected to the pressure line; and an electronic control unit including an electronic processor communicatively connected to the pressure sensor. The electronic control unit is configured to receive an unfiltered pressure signal from a pressure sensor; electronically filter the unfiltered pressure signal to obtain a filtered pressure signal; and determine a dosing pressure signal based on the filtered pressure signal and the unfiltered pressure signal. Based on the dosing pressure signal, the electronic control unit determines an integrated value and then determines whether the pressure line is obstructed by comparing the integrated value with a predetermined threshold.

Other aspects of the disclosure will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
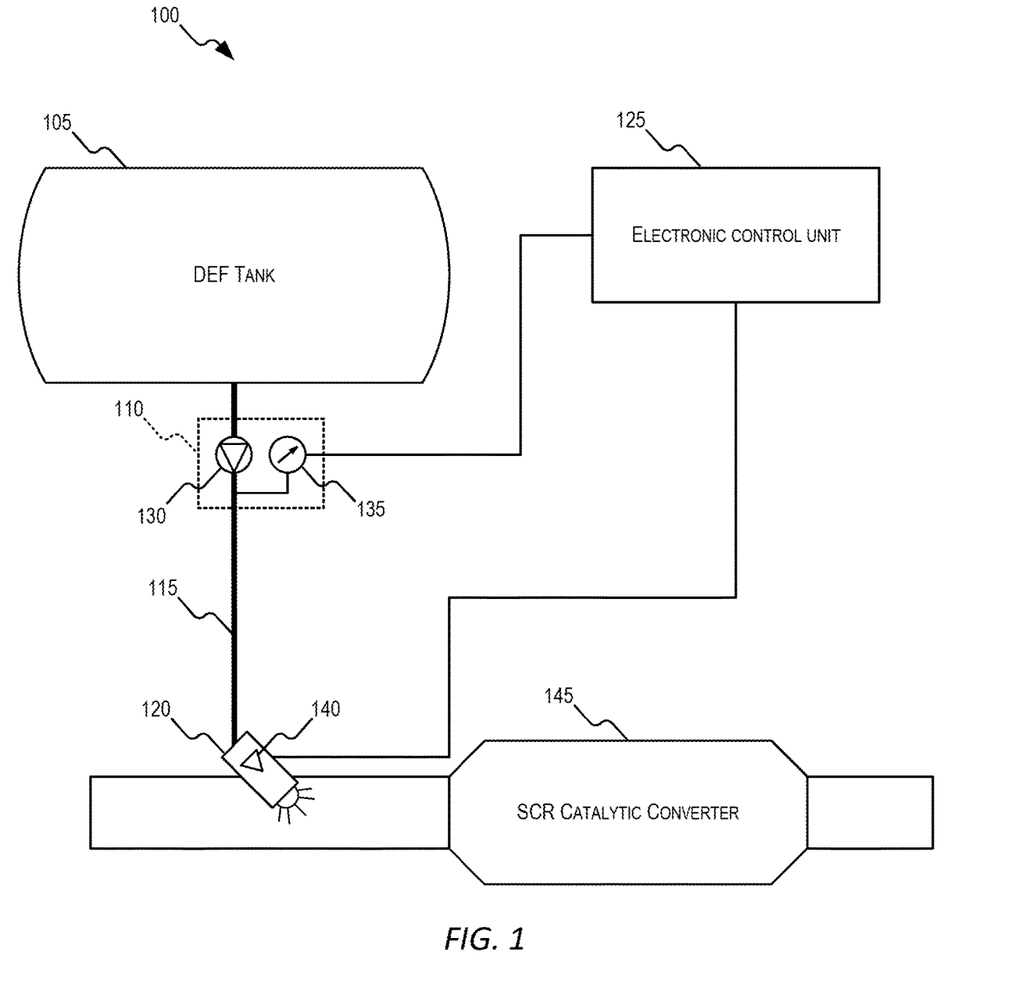
FIG. 1 is a diagram of a diesel exhaust fluid (DEF) delivery system in accordance with some embodiments.

FIG. 1 illustrates an example of a Diesel Exhaust Fluid (DEF) delivery system 100 for a diesel motor vehicle according to one embodiment. In the embodiment illustrated, the DEF delivery system 100 includes a DEF tank 105, a supply module 110, a pressure line 115, a dosing module 120, and an Electronic Control Unit (ECU) 125. The DEF tank 105 is filled with Diesel Exhaust Fluid (DEF) (for example, an aqueous solution of 32.5% urea in water). The supply module 110 includes a pump 130 and a pressure sensor 135. The dosing module 120 includes a dosing valve 140.

Components of the DEF delivery system 100 may communicate via various types of communication links. For example, the electronic control unit 125, the supply module 110, the dosing module 120, and other vehicle systems, may communicate with each over one or more wired or wireless connections. In some cases, these components communicate via communication buses (for example, over a vehicle communication bus, such as a CAN bus).

In operation of the DEF delivery system 100, the pump 130 removes DEF from the DEF tank 105 and supplies it to the dosing module 120. DEF is thereby pressurized within the pressure line 115. In some embodiments, the pressure line 115, although listed herein as a separate component from the dosing module 120 and the supply module 110, is intended to encompass the entire supply pathway downstream of the pump 130. For example, the pressure line 115 may include some of all of the locations within the DEF delivery system 100 where the DEF is pressurized. This may include an output of the dosing module 120, the dosing valve 140, the injector (not illustrated), or others. As a consequence, when an obstruction is detected within the pressure line 115, as described below, this may include an obstruction at the dosing valve 140 (for example, a plugged injector).

The pressure sensor 135 senses the DEF pressure in the pressure line 115 and generates an unfiltered (i.e., raw) pressure signal representative of the pressure of the DEF in the pressure line 115. The electronic control unit 125 receives the unfiltered pressure signal from the pressure sensor 135.

The dosing valve 140 injects the DEF from the pressure line 115 into an exhaust stream upstream of a Selective Catalytic Reduction (SCR) catalytic converter 145. The DEF is then converted into ammonia in the exhaust stream. Inside the SCR catalytic converter 145, the ammonia reduces nitrogen oxides from the exhaust stream into water and nitrogen.

In some embodiments, the electronic control unit 125 controls the dosing valve 140 to control the amount of DEF that enters the exhaust stream. In these cases, the electronic control unit 125 sets a dosing frequency of the dosing module 120. The dosing frequency is the frequency at which the dosing module 120 injects the DEF into the exhaust stream. In some embodiments, the electronic control unit 125 sets the dosing frequency between approximately 1 Hertz (Hz) and 4 Hertz. As an example, when the dosing frequency is 2 Hertz, the dosing module 120 injects two doses of DEF in the exhaust stream every second, with each dose lasting for a period of up to 500 milliseconds.

In other embodiments, the DEF delivery system 100 includes a dosing control unit (DCU) (not illustrated) that controls injection of the DEF into the exhaust stream. In this instance, the dosing control unit controls injection rates of the DEF. The dosing control unit may perform some or all of the functionality described herein as being performed by the electronic control unit 125. The dosing control unit may be located within or local to particular components of the DEF delivery system 100. For example, the dosing control unit may be a component of the dosing module 120, the supply module 110, or others. The dosing control unit may include similar components as the electronic control unit 125, and in some embodiments, the dosing control unit or the electronic control unit 125 may perform functions described herein solely with hardware (for example, an application specific integrated circuits (ASIC).

Figure 2:
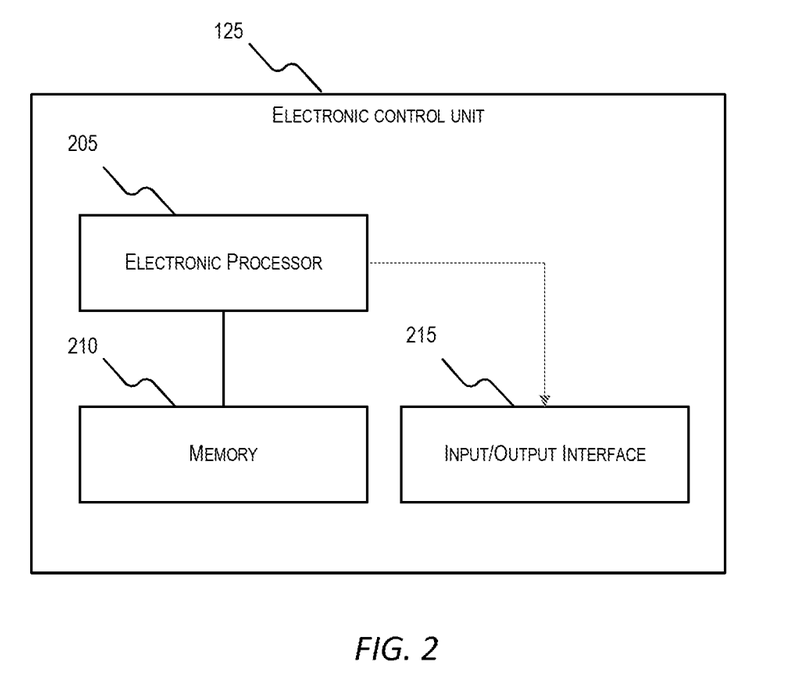
FIG. 2 is a diagram of an electronic control unit of the DEF delivery system of FIG. 1 in accordance with some embodiments.

FIG. 2 illustrates an example of the electronic control unit 125 for the DEF delivery system 100 according to one embodiment. The electronic control unit 125 includes a plurality of electrical and electronic components that provide power, operational control, and protection to the components and modules within the electronic control unit 125, the DEF delivery system 100, or both. The electronic control unit 125 includes, among other things, an electronic processor 205 (such as a programmable electronic microprocessor, microcontroller, or similar device), a memory 210 (for example, non-transitory, machine readable memory), and an input/output interface 215. In some embodiments, the electronic control unit 125 includes additional, fewer, or different components. For example, the electronic control unit 125 may be implemented in several independent electronic control units or modules each configured to perform specific steps or functions of the electronic control unit 125.

The electronic processor 205, in coordination with the memory 210, the input/output interface 215, and other components of the electronic control unit 125, is configured to perform the processes and methods discussed herein. For example, the electronic processor 205 is configured to retrieve from memory 210 and execute, among other things, instructions related to receiving and analyzing the unfiltered pressure signal from the pressure sensor 135. The input/output interface 215 may include one or more input and output modules for communicating with the other components of the DEF delivery system 100 as well as other components of the vehicle. For example, the input/output interface 215 is configured to communicate with the supply module 110 and the dosing module 120.

Figure 3:
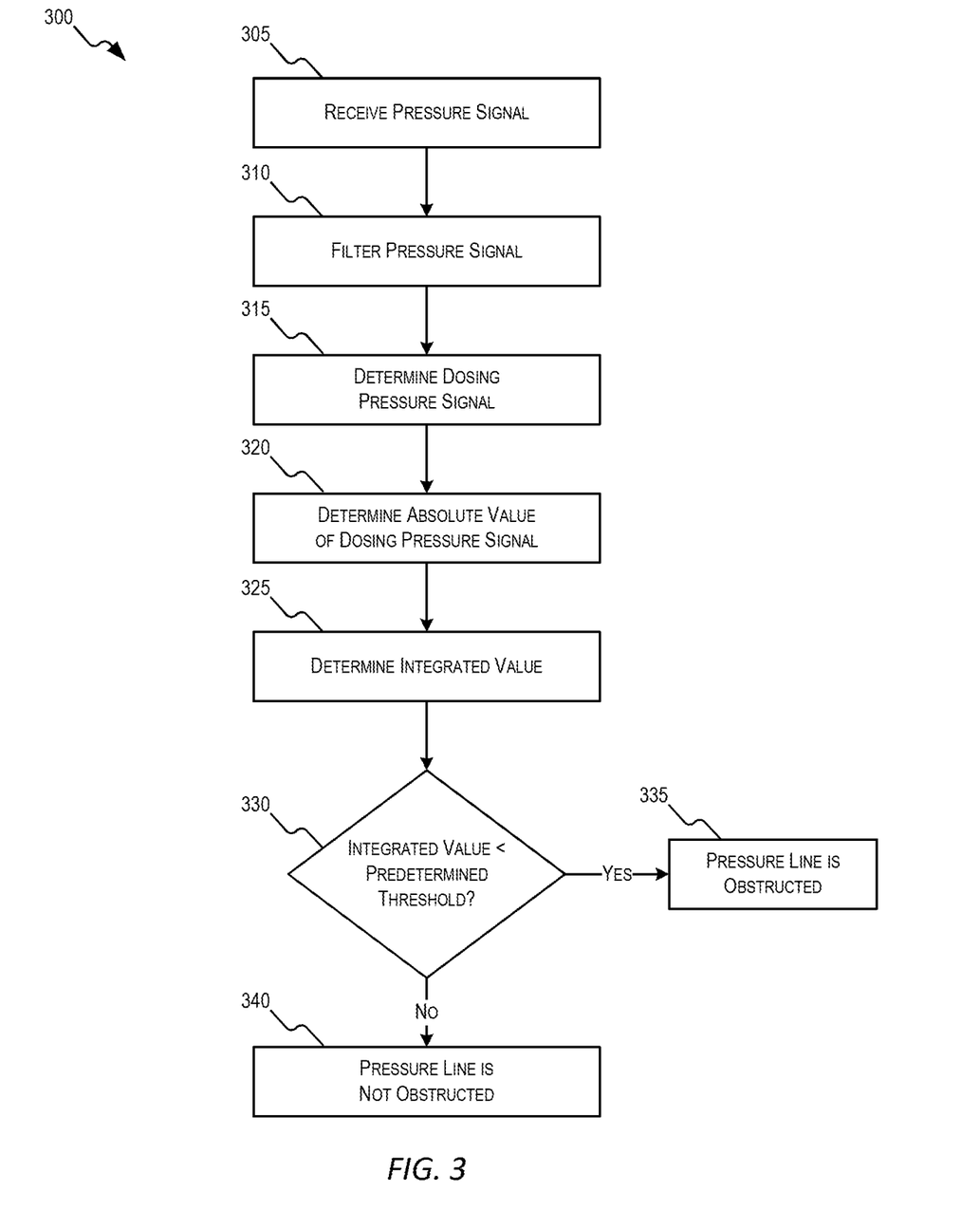
FIG. 3 is an exemplary flowchart of detecting when a pressure line, included in the DEF delivery system of FIG. 1, is obstructed.

FIG. 3 is an exemplary method 300 of detecting when the pressure line 115 in the DEF delivery system 100 is obstructed (for example, partially or completely blocked). The obstruction may be caused from a variety of factors including freezing of the DEF or particulates in the DEF. During operation of the DEF delivery system 100, the electronic control unit 125 receives an unfiltered pressure signal from the pressure sensor 135 (block 305). The electronic control unit 125 filters the unfiltered pressure signal to obtain a filtered pressure signal (block 310). In some embodiments, the unfiltered pressure signal is filtered a frequency equal to or approximately equal to the dosing frequency. In some embodiments, the unfiltered pressure signal is filtered with a band-stop filter such as, for example, a notch filter. The notch filter is a band-stop filter with a narrow stopband, which may be applied to the unfiltered pressure signal and have a center frequency equal to the dosing frequency. In some embodiments, the unfiltered signal is filtered using discrete components. In alternate embodiments, the electronic control unit 125 filters the unfiltered pressure signal using a band-stop filter, a band-pass filter, a high-pass filter, a low pass filter, or some combination thereof.

After filtering the unfiltered pressure signal, the electronic control unit 125 determines a dosing pressure signal based on the filtered and unfiltered pressure signals (block 315). The dosing pressure signal represents the pressure signal at a frequency equal to the dosing frequency. In some embodiments, the electronic control unit 125 determines the dosing pressure signal by subtracting the filtered pressure signal from the unfiltered pressure signal.

Next, the electronic control unit 125 determines the absolute value of the dosing pressure signal (block 320). The electronic control unit 125 then integrates the absolute value of the dosing pressure signal for a predetermined period of time to determine an integrated value (block 325). As an example, in some embodiments, the electronic control unit 125 integrates the absolute value of the dosing pressure signal for period of ten seconds.

In some embodiments, an integrated value between approximately 0 and 70 indicates that the pressure line 115 is obstructed and an integrated value over approximately 300 indicates that the pressure line 115 is not obstructed. The electronic control unit 125 compares the integrated value to a predetermined threshold (block 330). In some embodiments, the predetermined threshold is 100. In some embodiments, the predetermined threshold is determined based on a required sensitivity for a particular application. For example, the threshold may be determined based on physical characteristics of the DEF delivery system 100. In some embodiments, the threshold is adjusted based on testing and analysis of the DEF delivery system 100.

The electronic control unit 125 determines that the pressure line 115 is obstructed when the integrated value is less than the predetermined threshold (at block 335). Alternatively, the electronic control unit 125 determines that the pressure line 115 is not obstructed when the integrated value is greater than the predetermined threshold (at block 340). In some embodiments, the predetermined threshold consists of an upper threshold and a lower threshold. In this instance, the electronic control unit 125 determines that the pressure line 115 is obstructed when the integrated value is less than the lower threshold and determines that the pressure line 115 is not obstructed when the integrated value is greater than the upper threshold.

In some embodiments, the electronic control unit 125 performs one or more corrective actions when it detects that the pressure line 115 is obstructed. For example, in some embodiments, the DEF delivery system 100 includes a heater (not shown) which heats the pressure line 115. In some such embodiments, upon detecting that the pressure line 115 is obstructed, the electronic control unit 125 activates or increases the duty cycle of the heater to defrost the pressure line 115. This action can prevent the vehicle from going into inducement or otherwise incurring reduced functionality of the vehicle. This may prevent the need to have a fault code generated that interrupts the operation of the vehicle.

In some embodiments, upon detecting that the pressure line 115 is obstructed, the electronic control unit 125 halts operation of the pump 130 in the supply module 110 or reduces the duty cycle of the pump 130. The electronic control unit 125 may also open the dosing valve 140 in the dosing module 120. In these cases, the electronic control unit 125 may monitor the unfiltered pressure signal to determine if there is a reduction in pressure. Based on the behavior of the unfiltered pressure signal, the electronic control unit 125 may determine a location of the obstruction or other malfunction within the pressure line 115. For example, if no reduction in pressure occurs when the dosing valve 140 is opened, the electronic control unit 125 may determine that an obstruction is present at the dosing valve 140 (for example, a plugged injector).

Figure 4:
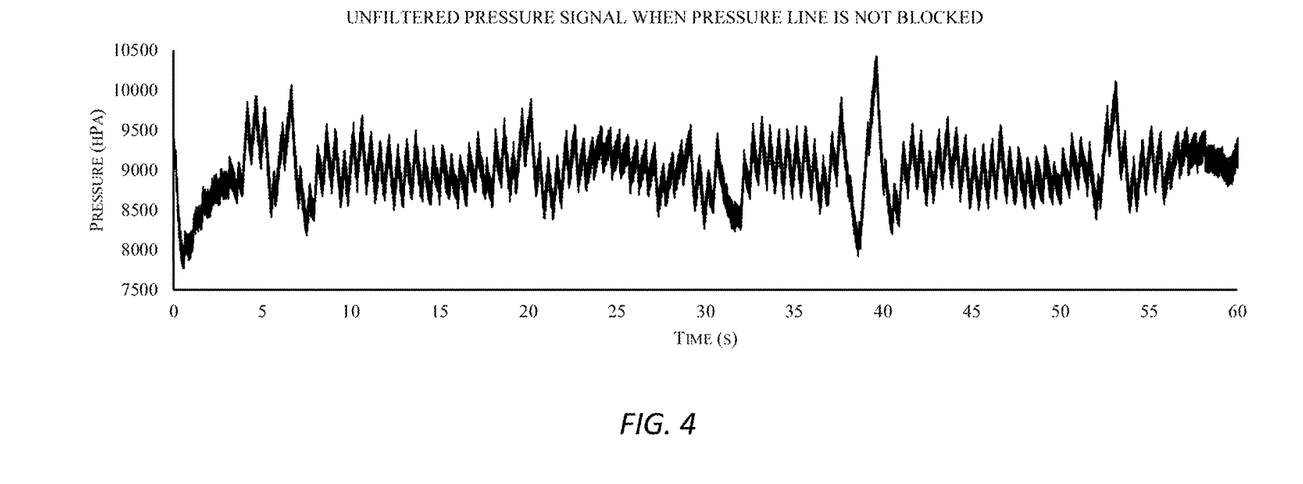
FIG. 4 is a graph of an exemplary unfiltered pressure signal when the pressure line in FIG. 1 is not obstructed.
Figure 5:
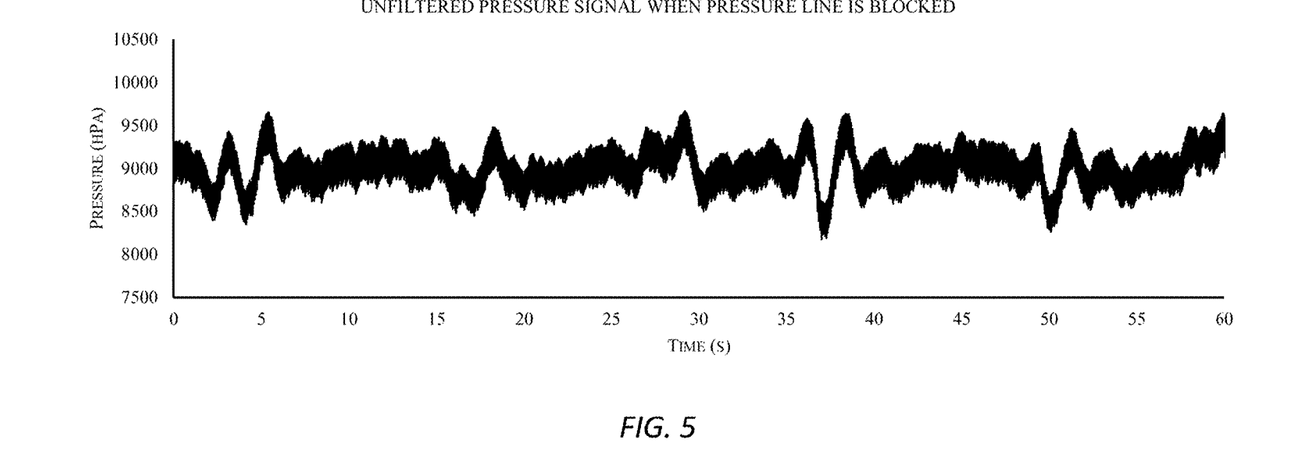
FIG. 5 is a graph of an exemplary unfiltered pressure signal when the pressure line in FIG. 1 is obstructed.
Figure 6:
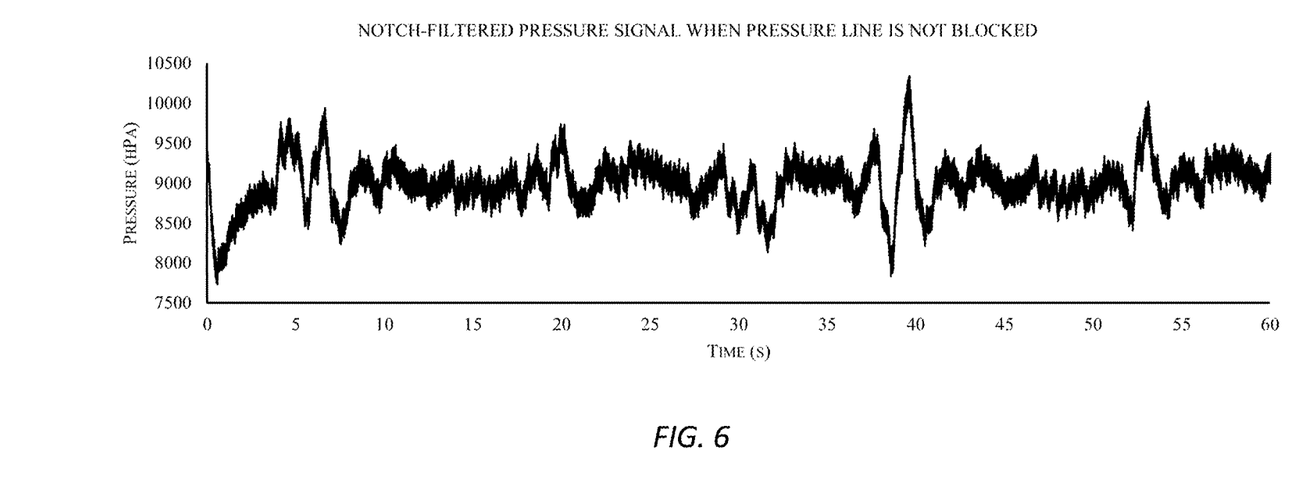
FIG. 6 is a graph of an exemplary filtered pressure signal when the pressure line in FIG. 1 is not obstructed.
Figure 7:
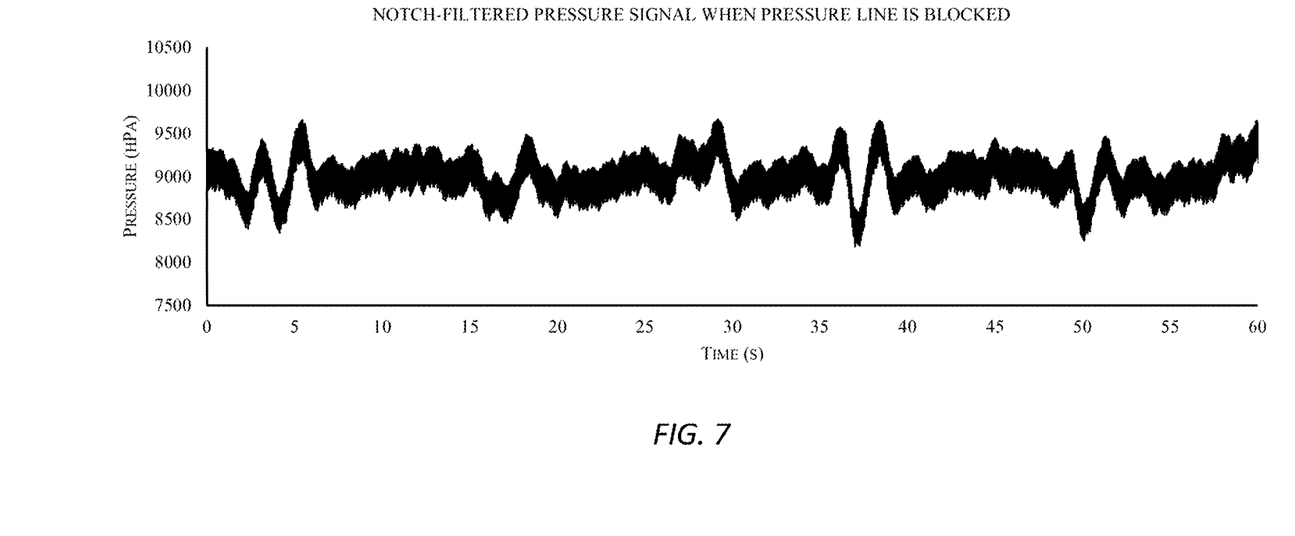
FIG. 7 is a graph of an exemplary filtered pressure signal when the pressure line in FIG. 1 is obstructed.

FIGS. 4-9 illustrate exemplary comparisons of an unobstructed pressure line versus an obstructed pressure line. In particular, FIG. 4 illustrates an exemplary unfiltered pressure signal when the pressure line 115 is not obstructed. FIG. 5 illustrates an exemplary unfiltered pressure signal when the pressure line 115 is obstructed. FIG. 6 illustrates the unfiltered pressure signal in FIG. 4 after filtering (for example, via a notch filter) at a dosing frequency of 2 Hz. Similarly, FIG. 7 illustrates the unfiltered pressure signal in FIG. 5 after filtering at a dosing frequency of 2 Hz.

Figure 8:
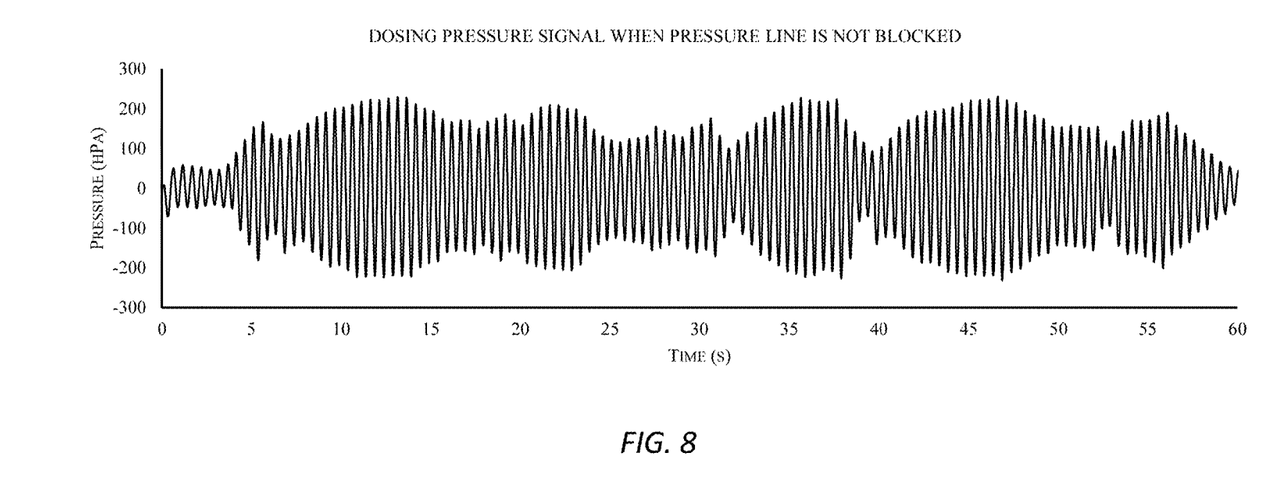
FIG. 8 is a graph of an exemplary dosing pressure signal when the pressure line in FIG. 1 is not obstructed.

FIG. 8 illustrates a dosing pressure signal for the pressure line 115 when it is not obstructed. The dosing pressure signal in FIG. 8 may be determined by the electronic control unit 125 by subtracting the filtered pressure signal in FIG. 6 from the unfiltered pressure signal in FIG. 4.

Figure 9:
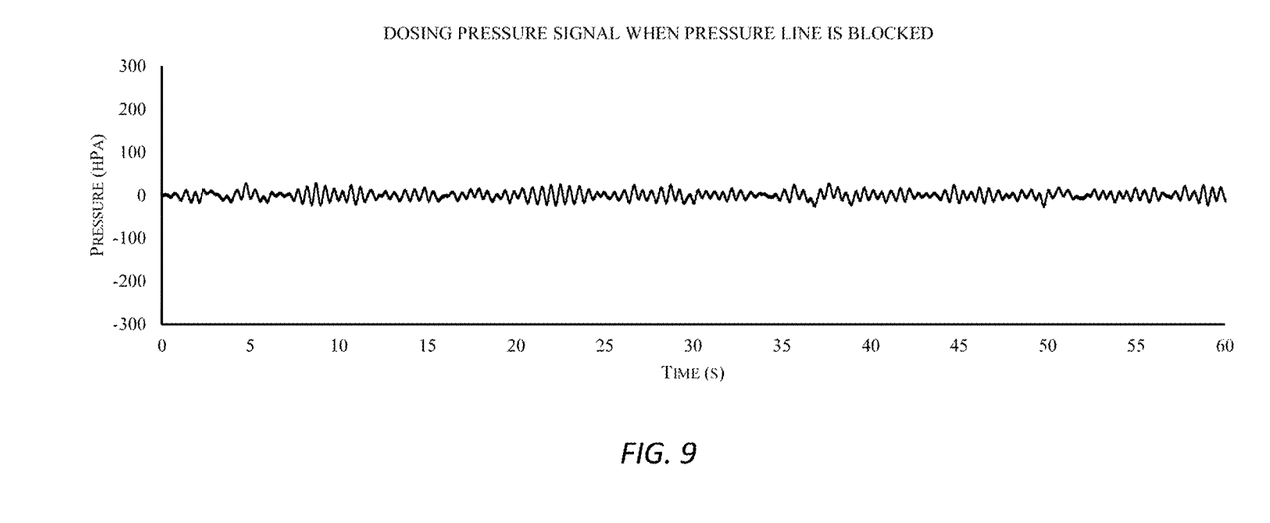
FIG. 9 is a graph of an exemplary dosing pressure signal when the pressure line in FIG. 1 is obstructed.

FIG. 9 is a dosing pressure signal for the pressure line 115 when it is obstructed. The dosing pressure signal in FIG. 9 may be determined by the electronic control unit 125 by subtracting the filtered pressure signal in FIG. 7 from the unfiltered pressure signal in FIG. 5. As illustrated in FIGS. 8 and 9, the amplitude of dosing pressure signal is greater when the pressure line 115 is not obstructed as opposed to when the pressure line 115 is obstructed. Thus, an obstructed pressure line can be detected based on the dosing pressure signal by comparison to a threshold.

Low dosing events (for example, dosing between zero and 5% of maximum dosage) and very high dosing events (for example, dosing between 95% and 100% of maximum dosage) may cause low pressure fluctuations. These low pressure fluctuations may affect the integrated value. Thus, in some embodiments, the electronic control unit 125 detects such events and does not evaluate the integrated value during low and very high dosing events. In this way, when a low dosing event or a high dosing event is occurring, the electronic control unit 125 does not determine whether the pressure line 115 is obstructed, but rather waits for dosing to return to a value in between the low and high dosing periods.

When the DEF delivery system 100 operates for an extended period of time (for example, approximately 8 to 10 hours), air in the filters of the DEF delivery system 100 may be expelled. This can increase the "stiffness" of the DEF delivery system 100 as the influence of the dosing events on the integrated value is greater when the air is expelled from the filters. In some embodiments, the electronic control unit 125 accounts for the length of operating time of the DEF delivery system 100 when performing the methods listed herein. Thus, the electronic control unit 125 may account for the "stiffness" of the DEF delivery system 100 by factoring in changes in "stiffness" over time. When determining the integrated value, the electronic control unit 125 may compensate or adjust the integrated value based on the "stiffness" of the DEF delivery system 100. In other embodiments, the electronic control unit 125 may defer determinations of obstructions in the pressure line 115 until the DEF delivery system 100 settles to a lower "stiffness" value.

In some embodiments, the electronic control unit 125 generates a diagnostic code when the pressure line 115 is determined to be obstructed. This may include generating an indication to an operator (for example, a warning light on the dashboard of the vehicle), an error signal indicative of a malfunction in the DEF delivery system 100, or other maintenance required indication.

Various features, advantages, and embodiments are set forth in the following claims.

What is claimed is:

1. A method of detecting whether a pressure line in a diesel exhaust fluid (DEF) delivery system has an obstruction, the method comprising:
   receiving an unfiltered pressure signal from a pressure sensor;
   electronically filtering the unfiltered pressure signal to obtain a filtered pressure signal, wherein electronically filtering the unfiltered pressure signal is performed with a band-stop filter with a center frequency equal to a dosing frequency;
   determining a dosing pressure signal based on the filtered pressure signal and the unfiltered pressure signal;
   determining an integrated value based on the dosing pressure signal;
   determining, at an electronic control unit, whether the pressure line is obstructed by comparing the integrated value with a predetermined threshold.

2. The method according to claim 1, wherein determining the dosing pressure signal based on the filtered pressure signal and the unfiltered pressure signal includes subtracting the filtered pressure signal from the unfiltered pressure signal to obtain the dosing pressure signal.

3. The method according to claim 1, wherein determining the integrated value based on the dosing pressure signal includes integrating the dosing pressure signal for a predetermined period of time to obtain the integrated value.

4. The method according to claim 1, wherein determining the integrated value based on the dosing pressure signal includes determining an absolute value of the dosing pressure signal and then integrating the absolute value of the dosing pressure signal for a predetermined period of time.

5. The method according to claim 1, further comprising
   determining when the integrated value is less than the predetermined threshold and
   determining that the pressure line is obstructed when the integrated value is less than the predetermined threshold.

6. The method according to claim 1, further comprising generating an error signal indicative of a malfunction in the DEF delivery system when the pressure line is obstructed.

7. The method according to claim 1, further comprising
   determining when the integrated value is greater than the predetermined threshold and
   determining that the pressure line is not obstructed when the integrated value is greater than the predetermined threshold.

8. The method according to claim 1, further comprising determining when a low dosing event is occurring and not determining whether the pressure line is obstructed during the low dosing event.

9. The method according to claim 1, further comprising determining when a high dosing event is occurring and not determining whether the pressure line is obstructed during the high dosing event.

10. A diesel exhaust fluid (DEF) delivery system for a vehicle comprising:
    a pressure line configured to supply DEF to an exhaust pipe;
    a pressure sensor connected to the pressure line; and
    an electronic control unit including an electronic processor communicatively connected to the pressure sensor, the electronic control unit configured to
    receive an unfiltered pressure signal from the pressure sensor;
    electronically filter the unfiltered pressure signal to obtain a filtered pressure signal, wherein the electronic control unit is configured to electronically filter the unfiltered pressure signal to obtain a filtered pressure signal by applying a band-stop filter with a center frequency equal to a dosing frequency;
    determine a dosing pressure signal based on the filtered pressure signal and the unfiltered pressure signal;
    determine an integrated value based on the dosing pressure signal;
    determine whether the pressure line is obstructed by comparing the integrated value with a predetermined threshold.

11. The system according to claim 10, wherein the electronic control unit is configured to determine the dosing pressure signal based on the filtered pressure signal and the unfiltered pressure signal by subtracting the filtered pressure signal from the unfiltered pressure signal to obtain the dosing pressure signal.

12. The system according to claim 10, wherein the electronic control unit is configured to determine the integrated value based on the dosing pressure signal by integrating the dosing pressure signal for a predetermined period of time to obtain the integrated value.

13. The system according to claim 10, wherein the electronic control unit is configured to determine the integrated value based on the dosing pressure signal by determining an absolute value of the dosing pressure signal and then integrating the absolute value of the dosing pressure signal for a predetermined period of time.

14. The system according to claim 10, wherein the electronic control unit is further configured to
    determine when the integrated value is less than the predetermined threshold and
    determine that the pressure line is obstructed when the integrated value is less than the predetermined threshold.

15. The system according to claim 10, wherein the electronic control unit is further configured to generate an error signal indicative of a malfunction in the DEF delivery system when the pressure line is obstructed.

16. The system according to claim 10, wherein the electronic control unit is further configured to
    determine when the integrated value is greater than the predetermined threshold and
    determine that the pressure line is not obstructed when the integrated value is greater than the predetermined threshold.

17. The system according to claim 10, wherein the electronic control unit is further configured to determine when a low dosing event is occurring and configured to not determine whether the pressure line is obstructed during the low dosing event.

18. The system according to claim 10, wherein the electronic control unit is further configured to determine when a high dosing event is occurring and configured to not determine whether the pressure line is obstructed during the high dosing event.

\* \* \* \* \*